Figure 1:
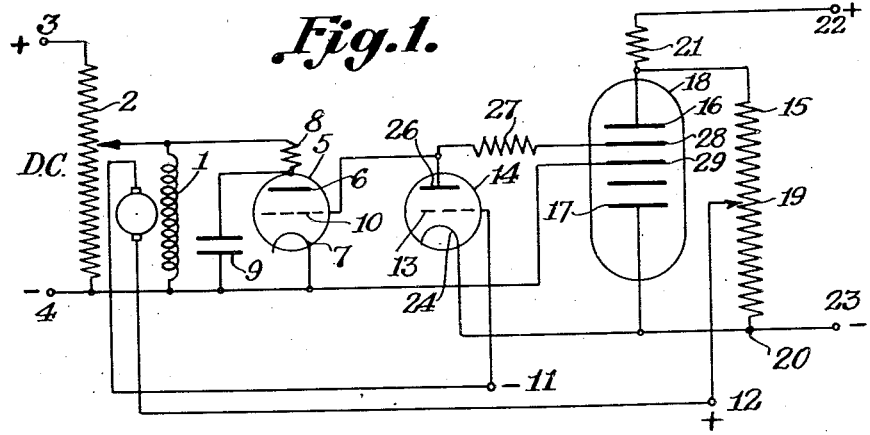

April 26, 1938.   J. S. THOMPSON   2,115,352
VOLTAGE REGULATOR
Filed Aug. 7, 1935

Inventor:
John S. Thompson
M. H. Lockwood
Attorney.

Patented Apr. 26, 1938

2,115,352

UNITED STATES PATENT OFFICE 2,115,352

VOLTAGE REGULATOR

John Stevenson Thompson, London, England, assignor to The General Electric Company Limited, London, England Application August 7, 1935, Serial No. 35,139
In Great Britain August 7, 1934

6 Claims. (Cl. 171—312)

This invention relates to means for maintaining constant the output voltage of an electric generator of the type in which the output voltage depends on the strength of a magnetic field excited by an electric current flowing in a coil. More particularly it relates to such means when the generator is of the usual type in which an armature moves in the field of a magnet excited by field coils, but it will be seen that the term generator may have a more general meaning.

It has previously been proposed to regulate the voltage of an electric generator by means including gas discharge devices and thermionic amplifiers; it has also been proposed to regulate it by balancing the voltage to be regulated against some constant voltage.

Thus it has previously been proposed to excite an alternator by supplying the exciter field winding with current obtained by rectifying the A. C. output of the alternator by means of a grid-controlled mercury vapour rectifier. An alternating voltage of suitable phase derived from the output of the alternator is applied together with a D. C. bias to the grid so that current flows in the field winding for a whole or a part of the cycle according as the output voltage of the alternator is above or below its correct value.

To enable the grid of a gas discharge device to take control, it is necessary to interrupt the discharge at frequent intervals, and, where the output voltage to be controlled is itself an alternating voltage, this interruption of the discharge may readily be effected, as in the above proposal, by applying between cathode and anode an alternating voltage derived from the said output voltage. When, however, the output voltage is a D. C. voltage, as in the case of a D. C. generator, then there is no A. C. voltage available for effecting interruption of the discharge through the gas discharge device.

The object of the present invention is to provide means for controlling the output voltage, which means are equally applicable to the control of either D. C. or A. C. voltage. This object is achieved according to the invention by arranging for the discharge device to be set into relaxation oscillations, which will automatically start and stop, even when the supply to the triode is D. C.

According to the invention means for the purpose specified comprise a gas-filled triode between whose anode and cathode is connected (possibly in series with other elements) the coil the current through which determines the output voltage, means for causing relaxation oscillations in the said triode and control means for applying to the control grid of the said triode a voltage determined by the difference between the said output voltage and a fixed voltage, whereby the relaxation oscillations are caused to continue or cease according to the magnitude and/or sign of the said difference. Preferably the said fixed voltage is derived from a device of the kind known as a "Stabilivolt" consisting of a plurality of electrodes immersed in a gas, in which a discharge is maintained between two of these electrodes by any roughly constant source in series with a suitable ohmic resistance. The voltage between any pair of the electrodes is then substantially independent of variations in the source.

A gasfilled triode means primarily, as usual, a discharge device in which a discharge cannot start between the cathode and anode unless the grid potential is more positive than a certain critical potential, dependent on the anode potential. But the term is used here in a wider sense, which includes also a device differing from a gasfilled triode only in the possession of electrodes additional to the cathode, anode and control grid.

Figure 3:
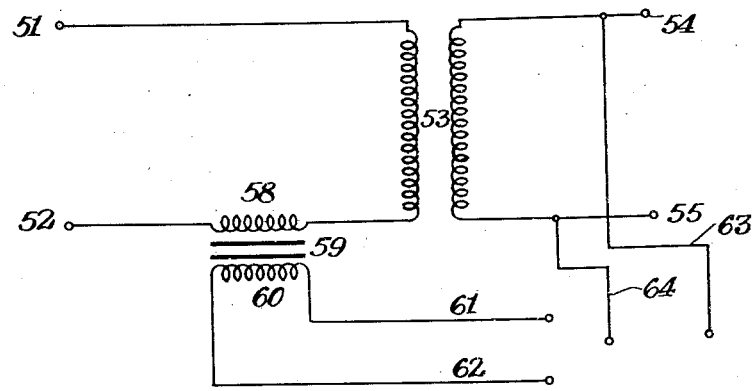
Figure 2:
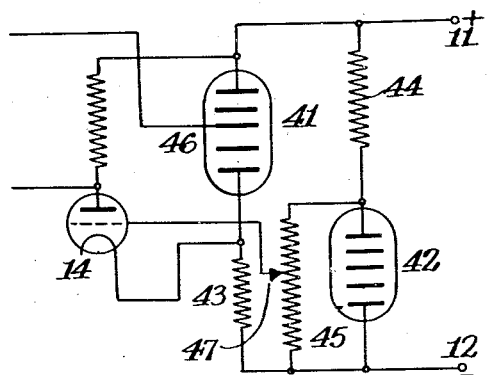

Certain embodiments of the invention will now be described by way of example with reference to the accompanying drawing. Of these Figure 1 shows the parts essential to one embodiment. Figure 2 shows a modification of part of Figure 1. Figure 3 shows an alternative embodiment involving some parts (not shown) common to the alternative and the original embodiment.

The arrangement of Figure 1 is for maintaining constant the output voltage of a direct current generator with separate excitation. The field coil 1 of the generator is fed by means of a potentiometer 2 from D. C. mains 3, 4 which may be (for example) 500 volt mains. 5 is the gas filled triode, whose anode 6 and cathode 7 are connected to the ends of the field coil 1 through the resistance 8. A condenser 9 is connected between the anode 6 and the cathode 7. If the grid 10 is sufficiently positive, relaxation oscillations of the familiar kind will occur, and a discharge between 6 and 7 will start and stop at intervals determined (for any given triode) by the external resistance in the anode circuit, the E. M. F. in that circuit, and the capacity across it. In this case the resistance is the sum of the resistance of 8 and of the part of the potentiometer 2 across which the coil 1 is connected. The E. M. F. is the voltage across this part of the potentiometer. The capacity is the condenser 9. The E. M. F. will vary with the output voltage, and accordingly the intervals will not be entirely independent of the output voltage, but it will appear that the operation of the device does not depend on the variation of the E. M. F. and would proceed in the same manner if the intervals were made independent of the output voltage by some subsidiary device, such as a decrease of the capacity 9 associated with a decrease of the E. M. F.

On the other hand, if the grid 10 is sufficiently negative, the relaxation oscillations cannot occur. For, even if they had been started and the grid was ineffective while the discharge was passing, it would regain control when the discharge stopped and prevent the discharge from starting again.

The mean current passing through the triode 5 is greater when the oscillations are in progress; the potential difference across the coil 1 and the current passing through it are less. Accordingly when the grid 10 is sufficiently positive, the discharge in 5 will abstract current from the field coil 1, so that the average current through it is decreased and the output voltage of the generator decreased.

This output voltage, led to the terminals 11, 12, is applied between the grid 13 of the thermionic amplifier 14 and a point 19 on the potentiometer 15 shunted across two electrodes 16, 17 of the "Stabilivolt" 18. The cathode 24 of amplifier 14 is joined to the negative end 20 of potentiometer 15, and the point 19 is chosen so that the potential difference between 19 and 20 is nearly equal to that between 11, 12, so that the bias of the grid 13 of the amplifier, when the output voltage has its normal value, is appropriate to its use as an amplifier.

21 is the series resistance of the "Stabilivolt", and 22, 23 are the terminals of its supply, which may be, for instance, 400 volts rectified A. C. It is to be observed that in this arrangement the same supply cannot be used for the terminals 3, 4 and the terminals 22, 23; for, as will appear presently, one of the terminals 3, 4 has to be connected to an electrode of 18 intermediate in potential between 22, 23.

The anode 26 of the amplifier 14 is fed through the resistance 27 from another electrode 28 of the "Stabilivolt". The anode voltage therefore varies in the usual way with the anode current, but is constant when that current is constant. Anode 26 is connected to grid 10 of the gas filled triode, and the cathode 7 to an electrode 29 of the "Stabilivolt", chosen so that when the output voltage has its least value the grid 10 is so negative to the cathode 7 that no discharge can pass. The voltage applied to the field coil 1 by the potentiometer 2 is so adjusted that, in this condition, the output voltage tends to rise above the minimum value, and, indeed, above the normal value.

A rise of the potential difference between 11, 12 above this least value makes the grid 13 more negative, decreases the anode current in 14, makes the anode 26 and the grid 10 more positive, and thus (if it is sufficient) starts the relaxation oscillations in the triode 5. Consequently current is abstracted from the field coil 1, and the output voltage falls. The result of this tendency for the oscillations to start when the output voltage rises, and thus to decrease the output voltage, will be that the output voltage will be maintained very near a steady value, fluctuating but slightly about it.

If the critical grid potential of the gasfilled triode were strictly constant, the amplifier 14 might not be needed, though it would always add to sensitivity. Actually it is slightly variable. The function of the amplifier 14 is to make the variation of the potential of the grid 10 due to variation of the output voltage so great that variation of the critical grid potential becomes unimportant. It has been found possible to maintain an output voltage of 200 constant to about plus or minus ¼ volt, in spite of the usual variations in the critical grid potential.

It has been pointed out that the supply for the field coils must be independent of that for the "Stabilivolt". But a modification of the arrangement makes it possible to supply the "Stabilivolt" from the output voltage which is to be generated.

The modified arrangement is shown in Figure 2 and needs little explanation. The output voltage is led to the terminals 11, 12; between these terminals are connected in parallel and opposition the two "Stabilivolts" 41, 42; that is to say, the two "Stabilivolts" each with a series resistance 43, 44 are connected in parallel, but the free end of resistance 44 is connected to 11 and the free end of resistance 43 to 12. Across one of the "Stabilivolts" is a potentiometer 45 to allow for fine adjustment. In virtue of the properties of the "Stabilivolt" the potential difference between the electrode 46 and the terminal 11 will be constant and so will the potential differences between the tapping 47 (so long as its position remains unaltered) and the terminal 12. Accordingly, variations in the potential difference between 46 and 47 will be equal to variations in the output voltage, and the mean potential difference may be chosen so as to be much smaller than the mean output voltage; a fixed voltage opposed to the output voltage is then derived from the "Stabilivolts" and balanced against the output voltage. Accordingly if 46 is connected to the cathode 7 of the triode 5 and 47 to the grid 10 by way of the amplifier 14, and if the normal difference between 46 and 47 is made such that the oscillations in 5 start only when the output voltage rises above its least value, the arrangement will operate in the same way as that of Figure 1.

Figure 3 shows the application of the invention to the control of an output voltage which is not that of a generator. 51, 52 are the terminals of a variable A. C. supply; they are connected to the consumer's terminals 54, 55, across which the voltage has to be constant, through the transformer 53 having a small step-up ratio. From terminals 54, 55, leads 63, 64 pass to the regulating apparatus. It will be supposed first that these leads 63, 64 pass through a rectifier (not shown), so that the voltage across the terminals 63, 64 is a D. C. voltage, rising and falling with the A. C. voltage between 54, 55. Terminals 63, 64 are connected to the terminals 11, 12 of an apparatus similar to that shown in Figure 1 in all that is to the right of the coil 1. But the coil is removed; the lead from the potentiometer 2 to the resistance 8 is interrupted by the terminals 61, 62 so that the discharge current through the triode 5 passes through the coil 60; and the potentiometer 2 may be replaced by a source of direct current wholly independent of the supply to be regulated. In this arrangement the occurrence of relaxation oscillations and the flow of an intermittent current through the coil 60 is determined, as explained before, by the voltage across the terminals 63, 64 and therefore by that across the terminals 54, 55. When this voltage decreases sufficiently, the current through the coil 60 has to increase; consequently the terminals 11 and 12 have to be of opposite polarity to that shown in Figure 1; that is to say 63 and 64 must be connected to 11, 12 so that 11 is positive relative to 12.

Coil 60 is the coil mentioned in the definition of the type to which the invention relates. The magnetic field excited by a current flowing in it increases the saturation of the core 9 of the choke 8 inserted in a lead between the terminal 52 and the transformer 53. Accordingly decrease of the voltage across 54, 55 (which is the voltage of the source of supply which has to be maintained constant) increases the saturation of the core, decreases the impedance of the choke 8, and thereby tends to increase again the voltage across 54, 55.

It is not always necessary that the voltage across 63, 64 should be rectified as hitherto supposed. For if the voltage applied between 11, 12 of Figure 1, by connection to 63, 64, has an alternating component, the relaxation oscillations will start when the peak value of this potential reaches a determinate value. By balancing this peak potential, instead of the rectified voltage, against the voltage from the "Stabilivolt", it can be arranged that intermittent discharges occur only when the voltage between 63 and 64 is abnormally low. In general, the interval between two successive starts will not be constant, but will vary in a cycle determined by the relation between the period of the A. C. supply and that of the relaxation oscillations. But these intervals will be substantially independent of the output voltage.

I claim:

1. In combination with an electric D. C. generator having an output voltage determined by the current flowing in a field coil, means for maintaining said output voltage substantially constant comprising a gas-filled electric discharge device having an anode, a cathode and a control grid, said field coil being connected between said anode and said cathode, a source of electromotive force, said source being arranged to supply current to said coil and said discharge device, oscillating means associated with said discharge device, said oscillating means being arranged to start and stop the discharge in said discharge device at intervals substantially independent of said output voltage, a "Stabilivolt" having one electrode connected direct to the positive end of said output, a second "Stabilivolt" having an electrode connected direct to the negative end of said output, a resistance connecting the other electrode of the first "Stabilivolt" to the negative end of the output, a second resistance connecting the other electrode of the second "Stabilivolt" to the positive end of said output, and control means associated with the control grid of said electric discharge device, said control means applying to said control grid a voltage determined by the voltage between said other electrodes of said "Stabilivolt", so that the voltage applied to said control grid renders said discharge device non-conducting upon a change of the output voltage, the current in said field coil being thereby changed in a direction to compensate said change of the output voltage.

2. In combination with an electrical device having an output voltage dependent on the strength of a magnetic field excited by an electric current flowing in a coil, means for maintaining said output voltage substantially constant comprising a gas-filled electric discharge tube having an anode, a cathode and a control grid, said coil being connected between said anode and said cathode, a source of direct current, said source being arranged to supply current to said coil and said discharge tube, oscillating means associated with said discharge tube, said oscillating means being arranged to start and stop the discharge in said tube at intervals substantially independent of said output voltage, a "Stabilivolt" having one electrode connected direct to the positive end of said output, a second "Stabilivolt" having an electrode connected direct to the negative end of said output, a resistance connecting the other electrode of the first "Stabilivolt" to the negative end of the output, a second resistance connecting the other electrode of the second "Stabilivolt" to the positive end of said output, and control means associated with the control grid of said tube, said control means applying to said control grid a voltage determined by the voltage between said other electrodes of said "Stabilivolts", so that the voltage applied to said control grid renders said tube non-conducting upon a change of the output voltage, the current in said coil being thereby changed in a direction to compensate said change of the output voltage.

3. A voltage regulator for maintaining a substantially constant potential in a load circuit wherein variations from the required constant potential are corrected by varying the energization of a coil in an electro-magnetic member, comprising a load circuit, a coil, a gas filled tube having anode, cathode and grid electrodes, a direct current supply circuit connected with said coil and with the anode-cathode circuit of said tube, said tube circuit being arranged to vary the energization of the electro-magnetic member by passing a series of uniformly intermittent impulses of direct current through said coil, a resistance arranged to cooperate with the supply circuit in charging a condenser in parallel circuit with the tube for establishing relaxation oscillations in the tube circuit and supplying said uniformly intermittent current impulses to the circuit of said coil, means for maintaining on the grid of the tube a constant potential which is below that required to establish and maintain said relaxation oscillations and means controlled by the load circuit when the potential thereof varies a prearranged amount from said required constant potential for increasing the grid charge so that said relaxation oscillations will start and be maintained until the required constant potential of the load circuit is restored.

4. A voltage regulator for maintaining a substantially constant potential in a load circuit as in claim 3 wherein the means for maintaining the grid of said tube at a constant potential which is below that required to start relaxation oscillations comprises a "Stabilivolt".

5. A voltage regulator for maintaining a substantially constant potential in a load circuit as in claim 3 wherein the means for increasing the grid charge so as to start and maintain the relaxation oscillations comprises an amplifier tube controlled by the potential in the load circuit and arranged to effect an increase of the grid charge when the potential in the load circuit varies from the required constant potential by a prearranged amount.

6. A voltage regulator for maintaining a substantially constant potential in a load circuit as in claim 3 wherein a "Stabilivolt" is provided for maintaining the grid of said tube at a constant potential which is below that required for starting the relaxation oscillations and a branch of the load circuit in cooperation with an amplifier tube is provided for increasing the potential on the grid so as to start the relaxation oscillations when the potential of the load circuit varies from the required potential by a prearranged amount.

JOHN STEVENSON THOMPSON.